July 25, 1933.   H. F. KELLOGG   1,919,728
WING NUT
Filed Dec. 27, 1932
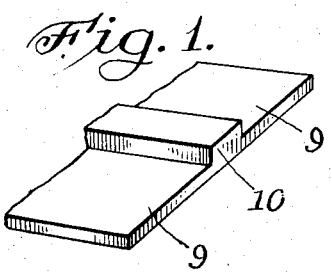
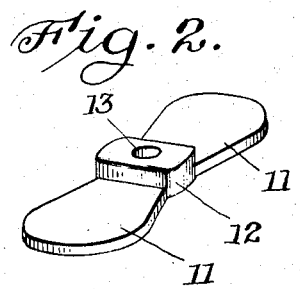
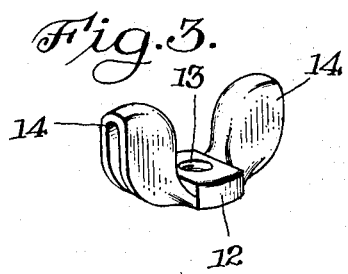
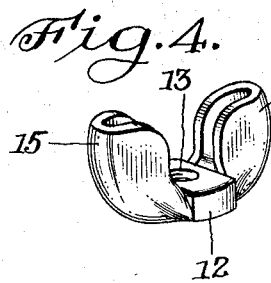
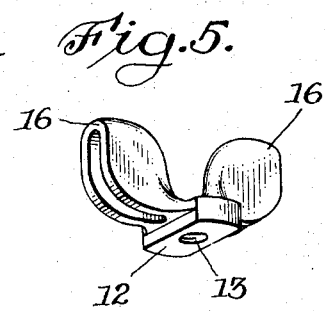
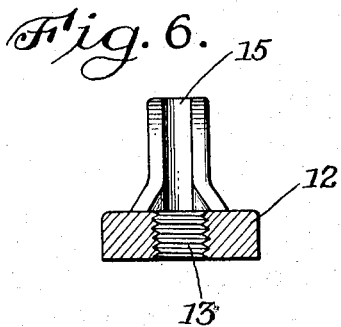
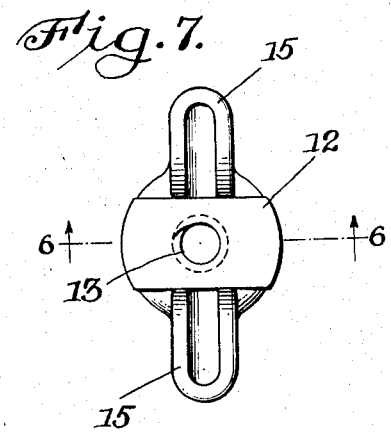
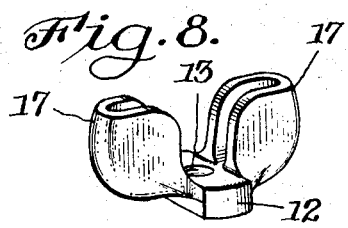
INVENTOR
Harry F. Kellogg
BY
ATTORNEY Patented July 25, 1933

1,919,728

UNITED STATES PATENT OFFICE

HARRY F. KELLOGG, OF CHICAGO, ILLINOIS, ASSIGNOR TO CENTRAL SCREW COMPANY, OF CHICAGO, ILLINOIS, A CORPORATION OF ILLINOIS

WING NUT

Application filed December 27, 1932. Serial No. 648,860.

This invention relates to wing nuts and its object is to provide an integral wing nut of strong and novel construction made by stamping and bending a metal blank to shape and having a solid substantial body which is tapped to receive a screw.

Another object of the invention is to provide a one-piece wing nut having strong and rigid wings bent or folded from sheet metal and projecting at each side of a solid body in the form of a block extending between and beyond the sides of the wings, said body being tapped to receive a screw and being of greater thickness than that of the wing material to provide a strong substantial and secure anchorage for the screw.

In the accompanying drawing I have illustrated a selected embodiment of the invention and referring thereto, Fig. 1 is a perspective view of a section of metal strip from which the wing nut is made.

Fig. 2 is a perspective view of the blank formed in the stamping operation.

Fig. 3 is a perspective view of one form of wing nut embodying my invention.

Fig. 4 is a perspective view of another form of wing nut embodying my invention.

Fig. 5 is a perspective view of still another form of wing nut embodying my invention.

Fig. 6 is a sectional view on the line 6—6 of Fig. 7.

Fig. 7 is a plan view of the wing nut shown in Fig. 4, and

Fig. 8 is a perspective view of another form of wing nut embodying my invention.

Referring to the drawing, I provide a rolled metal strip, Fig. 1, having substantially flat thin side portions 9 and a thick central rib portion 10, and stamp a blank therefrom as shown in Fig. 2 having wing members 11 formed from the side portions 9 of the strip and a body 12 connecting the wing members and formed from the central rib portion 10 of the strip. The body is tapped centrally at 13 to receive a screw. The wing members are connected with the body throughout the length of the inner ends of the wing members and substantially throughout the length of the body whereby a strong connection is provided between the wings and the body which precludes the possibility of bending or breaking the wings in applying the nut to or removing it from a screw, even with the use of tools and under any ordinary requirements.

The blank is subjected to a bending operation in which the wing members 11 are bent or folded to form wings which project upwardly and outwardly from the body and on opposite sides thereof. Each wing as shown is substantially U-shape in cross-section throughout its length and the wings are symmetrically disposed to provide a wing nut which can be easily and conveniently handled and adjusted, there being no raw edges or sharp corners to injure the fingers or to cause damage with things the nut may engage.

The body is solid in form and of substantial size, it projects beyond the wings on both sides thereof and completely fills the space between the wings and forms with the wings a solid integral wing nut of exceptional strength. It should be noted that strength is an important feature of wing nuts because their construction invites the application of excessive force in securing them in place and sometimes tools are used which provide a leverage and force far beyond that required and often sufficient to break an ordinary wing nut. Also, when a wing nut becomes frozen to a screw, the projecting wings invite the application of blows to loosen the nut and often these blows are applied without regard to the necessities but with a force depending largely upon the strength and skill of the operator. The solid block body of the wing nut is strong and substantial, the wings themselves are strong and substantial, and the connection between the body and the wings compares in strength with the body and the wings so that the invention provides a strong, rigid, one-piece wing nut formed from a strip of sheet material having a thick central rib portion by simple operations of stamping and bending or folding.

The wings may be differently formed as shown, for examples, in Figs. 3, 4, 5 and 8. In Fig. 3 the wings 14 project upwardly from the bottom of the body, their sides are substantially parallel and are connected at their inner edges and spaced apart at their outer edges. In Fig. 4 the wings 15 project upwardly from the bottom of the body, their sides are substantially parallel and are connected at their outer edges and spaced apart at their inner edges. The difference between the wings of Fig. 3 and of Fig. 4 consists principally in the manner in which the wing members are bent or folded in forming the wings. In Fig. 5 the wings 16 project upwardly from the top of the body and are made substantially like the wings 14 of Fig. 3. In Fig. 8 the wings 17 project upwardly from the top of the body and are made substantially like the wings 15 of Fig. 4. All of these forms may be made from the blank of Fig. 2 without requiring any other change than bending or folding the metal of the wing members as required to form the particular kind of wings. While I consider the particular designs of the wing nut as shown in the drawing especially desirable for commercial production the invention does not depend upon these particular designs and the wings and body may be made in other shapes and sizes and arrangements within the scope of my invention.

The invention provides a wing nut of simple and novel construction which can be manufactured at relatively low cost in a few simple operations from a rolled metal strip. The wing nut is strong and substantial in construction and is provided with ample body metal to receive a tap of sufficient length to insure strength and secure anchorage with a screw. The construction of the wing nut furnishes all the strength required to enable it to be used in place of cast and other and more complicated nuts which have been used heretofore and also in many places where other nuts are now customarily used.

I claim:

1. A sheet metal wing nut comprising a body, wings folded substantially U-shaped and integral with the body and extending upwardly and outwardly from opposite sides of the body, said body comprising a solid block having a tapped opening thereon, and the metal of the block being thicker both in the directions longitudinally and transversely of the opening than the metal of the wings to insure firm anchorage with a screw threaded to said opening.

2. A wing nut formed from a single piece of sheet metal strip and having a rib thereon providing a body consisting of a solid block, a threaded opening in said block to receive a screw, oppositely disposed wings integral with and projecting upwardly and outwardly from the body, the metal forming each wing being bent substantially U-shaped, and the body being of a greater thickness both in the directions longitudinally and transversely of the opening than that of the wing metal.

3. A wing nut formed from a single piece of sheet metal strip having a rib thereon providing a body consisting of a solid block, a threaded opening in said block to receive a screw, oppositely disposed wings integral with and projecting upwardly and outwardly from the top of the body, the metal forming each wing being bent substantially U-shaped, and the body being of a greater thickness both in the directions longitudinally and transversely of the opening than that of the wing metal.

4. A wing nut formed from a single piece of sheet metal strip having a rib thereon providing a body consisting of a solid block, a threaded opening in said block to receive a screw, oppositely disposed wings integral with and projecting upwardly and outwardly from the bottom of the body, the metal forming each wing being bent substantially U-shaped, and the body being of a greater thickness both in the directions longitudinally and transversely of the opening than that of the wing metal.

HARRY F. KELLOGG.